June 13, 1961 J. GÜTTLER 2,987,842
METHOD OF PRODUCING IDENTIFICATION MEANS CONSISTING
AT LEAST IN PART OF PLASTIC ETC.
Filed Feb. 7, 1958 2 Sheets-Sheet 1

INVENTOR:
JOSEF GÜTTLER
BY Leon M. Strauss
AGT.

June 13, 1961  J. GÜTTLER  2,987,842
METHOD OF PRODUCING IDENTIFICATION MEANS CONSISTING
AT LEAST IN PART OF PLASTIC ETC.
Filed Feb. 7, 1958  2 Sheets-Sheet 2
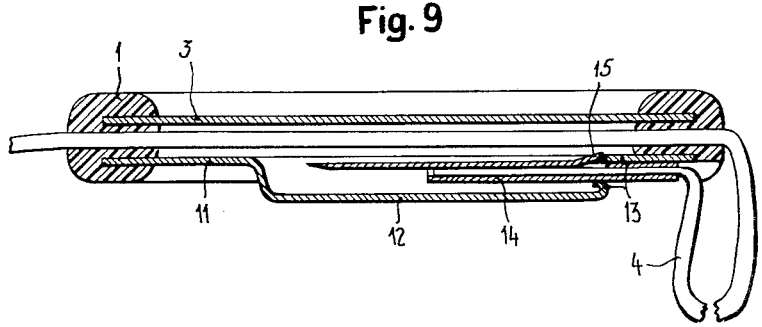
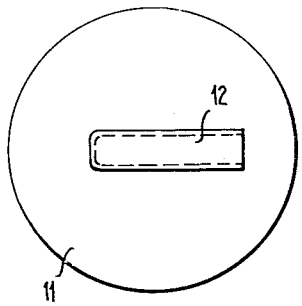
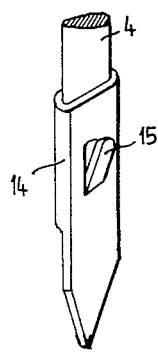
INVENTOR:
JOSEF GÜTTLER
BY

United States Patent Office 2,987,842
Patented June 13, 1961

2,987,842
METHOD OF PRODUCING IDENTIFICATION MEANS CONSISTING AT LEAST IN PART OF PLASTIC ETC.
Josef Güttler, Konstanz, Germany, assignor to Firma Stoffel & Sohn, Horn, Thurgau, Switzerland, a corporation of Switzerland
Filed Feb. 7, 1958, Ser. No. 713,930
Claims priority, application Switzerland May 2, 1955
3 Claims. (Cl. 40—20)

This invention relates to an identification seal.

The present application is a continuation-in-part of my copending patent application Serial No. 581,416 filed April 30, 1956, now abandoned.

An object of the present invention is to provide an identification seal which can be made in any shape desired so as to enable it largely to be adapted to esthetic and advertisement requirements and the face and the reverse may bear different lettering, which enhances its publicity value.

A second object of this invention is to provide an identification seal that can be manufactured with comparative ease so as to be economical, which is of particular importance for such a mass-produced article since seals of this type are commonly thrown away after the purchase of the article to which they are attached.

A further object is to provide an identification seal which may be produced in different colors; by way of example, the edge may be of a different color than the centre.

A further object is to provide an identification seal equipped with a flexible means of attachment such as a textile ribbon or cord during manufacture so that it will be held firmly.

Yet another object is to provide an identification seal of which the printed disks cannot subsequently be changed or removed so that they offer reliable protection against falsification and misuse.

The invention will appear more clearly from the following detailed description when taken in conjunction with the accompanying drawings, showing by way of example preferred embodiments of the inventive idea.

In the drawing:

FIG. 9 is a cross-section of a further embodiment of the seal;

FIG. 10 is a plan view of the disk-shaped member of the embodiment according to FIG. 9 placed on its rear side and FIG. 11 is a perspective view of the locking member attached to one end of the flexible connecting member, according to the embodiment of FIG. 9.

Figure 1:
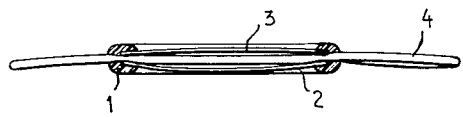
FIG. 1 is cross-section of a seal according to the invention.
Figure 2:
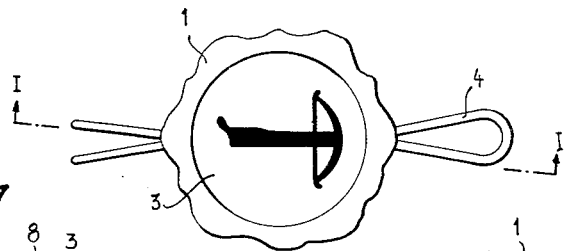
FIG. 2 is a plan view of the seal according to FIG. 1.
Figure 7:
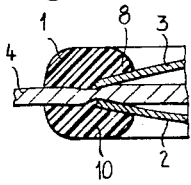
FIG. 7 is an enlarged sectional view of FIG. 1.
Figure 5:
FIG. 5 is a side view of an identification disk.
Figure 6:
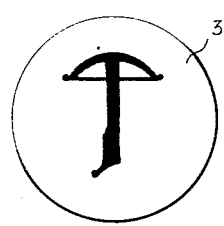
FIG. 6 is a plan view of the identification disk according to FIG. 5.

The identification seal according to FIGS. 1 and 2 comprises an annular rim 1 formed of a thermo-plastic material surrounding two disks 2 and 3 in circumferential direction thereof. These disks 2 and 3, of which one is shown in FIGS. 5 and 6, are provided with lettering, symbols or pictures prior to enclosing them with the plastic rim 1. The disks 2 and 3 may be formed of a variety of materials, such as paper, cardboard, plastic, metal. In order to be economical and to facilitate printing, the preferred material is a thin and preferably laminated sheet of cardboard. They are most advantageously produced by multiprinting the desired lettering and symbols on entire sheets from which the individual disks are then stamped.

Embedded between the two disks 2 and 3 is a flexible attaching member 4 such as a ribbon or cord. The identification seal is attached to the article to be identified by means of this attaching member 4. This attaching member 4 projects beyond the edge 1 at least on one side.

The two disks 2 and 3 are preferably slightly buckled so that they obtain relief and make an esthetically advantageous impression. The rim is forming an upper inwardly extending flange portion 8 and lower inwardly extending flange portion 10. The disks 2, 3 are engaged by said flange portions, preventing rotation of these disks relative to the rim.

Figure 3:
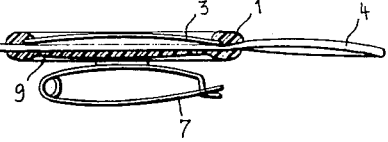
FIG. 3 is a cross-section of a further embodiment of the seal.
Figure 8:
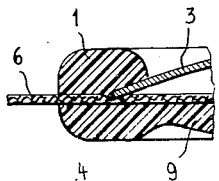
FIG. 8 is an enlarged sectional view of FIG. 3.
Figure 4:
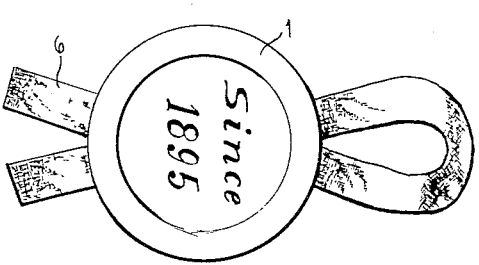
FIG. 4 is a plan view of the seal according to FIG. 3.

FIGS. 3 and 4 show a further and somewhat different embodiment of the invention. The back portion 9 of this seal is formed of a plastic material and forms a unit with the rim 1. The face is also provided with a printed disk 3. The back portion 9 may be lettered, commonly produced not by printing but by engraving on the molding tool. A safety pin 7 is bonded to the back portion 9.

One of the great advantages of the present identification seal resides in the fact that the configuration of the rim is not subject to the same limitations as metal seals. By way of example, the rim 1 can be formed, as shown in FIG. 2, to resemble a seal made of sealing wax, which makes an advantageous esthetic impression. Obviously, the rim may also be made in other shapes; it may be circular, triangular, polygonal or it may be formed to shapes other than those represented.

A plurality of colorings is possible in that, by way of example, the plastic rim 1 is made of a material having another color than the disc 2 and 3 so that tasteful polychrom seals are obtained.

The cord or string 4 may also be replaced by a ribbon 6 wide in comparison with its thickness, by way of example a textile fabric, or by an elastic ribbon. It is also possible to provide a safety pin 7 or similar device at the rear of the identification seal.

A further embodiment of the seal is represented in FIGS. 9 to 11. The disk 3 of the face is printed as explained in FIGS. 1 to 6. The disk-shaped member 11 on the rear side is provided with a convex portion 12 opening towards the rim 1. This convex portion is pressed out of the material of the disk 11. Remaining at the front end above and below is an edge portion or a web 13. The cord 4 has only one end extending between the disks 3 and 11 and the rim 1. Provided at the other end of the cord 4 is a locking member 14 (FIG. 11) designed so that it may be radially inserted into the interior of the convex portion 12 from the rim 1. The said locking member 14 is equipped with a latch 15 which is resilient and has its free end inclined towards the body of the locking member 14.

For the purpose of attachment, the cord 4 is threaded through the article to be identified and its locking member 14 inserted in the interior of the convex portion 12. After insertion, the latch 15 will snap outwardly and engage one of the webs 13 so that the locking member cannot be withdrawn from the seal without breaking the latter. The mouth of the concave portion is so designed that the web 13 is left above and below at the outer end so that it is immaterial whether the locking member is inserted with the latch facing upwards or downwards. Otherwise the design of the seal largely corresponds to that of FIGS. 1 to 8, the disk-shaped member 11 being preferably formed of metal. In order that the locking member may be readily inserted into the convex portion, the rim 1 is flattened at this point.

The identification seal according to FIGS. 1 and 2 is produced as follows:

Two printed disks 2, 3 and a cord 4 or a textile ribbon 6 are placed in a molding tool, the cord being placed between the two said disks 2, 3 so as to project beyond them on both sides and to extend between approximately the centres of the disks. A heated liquid plastic material is then supplied to the mold and the rim 1 formed. The disks 2, 3 and the cord 4 are thereby enclosed and firmly held together to form an integral unit by the rim 1. Finally, the gate is pinched off and the seal is ready for use.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. An identification seal for goods comprising two superposed disk-shaped identification members having each an outer and an inner side, a rim-member made of plastic material surrounding said identification members in circumferential direction thereof and having respective upper and lower inwardly extending flange portions, said identification members being arranged between said flange portions and engaged by the latter at the outer sides thereof, and a flexible connecting member penetrating said rim in substantially diametral direction and extending between said identification members adjacent said inner sides thereof, said flexible connecting member being secured by said rim member and serving to attach said seal to said goods, said flange portions clamping said flexible connecting member between said identification members and preventing rotation of the latter relative to said rim member and said connecting member, respectively.

2. An identification seal for goods comprising two superposed disk-shaped members having each an outer and an inner side, a rim-member made of plastic material surrounding said disk-shaped members in circumferential direction thereof and having respective upper and lower inwardly extending flange portions, said disk-shaped members being arranged between said flange portions and engaged by the latter at the outer sides thereof, and a flexible connecting member penetrating said rim in substantially diametral direction and extending between said disk-shaped members adjacent said inner sides thereof, said flexible connecting member being secured by said rim member and serving to attach said seal to said goods, one of said disk-shaped members being provided with an elongated outwardly extending portion, this outwardly extending portion being provided with an opening at its end adjacent said rim stop means in the interior of said outwardly extending portion, said flexible connecting member having one of its ends provided with a locking member which can be inserted into said outwardly extending portion through said opening, said locking member having a resilient latch which engages said stop means when said member is inserted and secures the locking member against withdrawal.

3. An identification seal for goods comprising two superposed disk-shaped identification members having each an outer and an inner side, a rim-member made of plastic material surrounding said identification members in circumferential direction thereof and having respective upper and lower inwardly extending flange portions, said identification members being arranged between said flange portions and engaged by the latter at the outer sides thereof, and a flexible connecting member penetrating said rim in substantially diametral direction and extending between said identification members adjacent said inner sides thereof, said flexible connecting member being secured by said rim member and serving to attach said seal to said goods, said flange portions clamping said flexible connecting member between said identification members and preventing rotation of the latter relative to said rim member and said connecting member, respectively, said flange portions extending divergingly with said identification members having their peripheral edges lying against said flanges, said identification members being buckled away from each other in the centers thereof.

References Cited in the file of this patent

UNITED STATES PATENTS

| | | |
|---|---|---|
| 2,284,922 | Rubinoff | June 2, 1942 |
| 2,364,870 | Otto | Dec. 12, 1944 |
| 2,379,793 | Eenigenburg | July 3, 1945 |
| 2,411,987 | D'Antonio | Dec. 3, 1946 |
| 2,840,939 | McClure | July 1, 1958 |

FOREIGN PATENTS

| | | |
|---|---|---|
| 1,059,163 | France | Nov. 10, 1953 |